United States Patent
Hori et al.

(10) Patent No.: US 11,086,918 B2
(45) Date of Patent: Aug. 10, 2021

(54) METHOD AND SYSTEM FOR MULTI-LABEL CLASSIFICATION

(71) Applicant: Mitsubishi Electric Research Laboratories, Inc., Cambridge, MA (US)

(72) Inventors: Takaaki Hori, Lexington, MA (US); Chiori Hori, Lexington, MA (US); Shinji Watanabe, Arlington, MA (US); John Hershey, Winchester, MA (US); Bret Harsham, Newton, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 753 days.

(21) Appl. No.: 15/371,513

(22) Filed: Dec. 7, 2016

(65) Prior Publication Data
US 2018/0157743 A1 Jun. 7, 2018

(51) Int. Cl.
*G06F 16/35* (2019.01)
*G06N 3/04* (2006.01)
*G06N 3/08* (2006.01)

(52) U.S. Cl.
CPC .......... *G06F 16/35* (2019.01); *G06N 3/0445* (2013.01); *G06N 3/08* (2013.01)

(58) Field of Classification Search
CPC .......... G06F 16/35; G06N 3/0445; G06N 3/08
See application file for complete search history.

(56) References Cited

U.S. PATENT DOCUMENTS

| 8,819,024 B1 * | 8/2014 | Toderici ................. G06F 16/36 |
| | | 707/740 |
| 8,924,313 B2 | 12/2014 | Chidlovskii |
| 2017/0112401 A1 * | 4/2017 | Rapin ................. A61B 5/04012 |
| 2018/0053097 A1 * | 2/2018 | Soni ....................... G06N 20/00 |

OTHER PUBLICATIONS

Charte et al. "Li MLC a label inference methodology for addressing high dimensionality in the label space for multilabel classification." IEEE Transactions on Neural Networks and Learning Systems, vol. 25, No. 10,Jan. 9, 2014. pp. 1842-1854. (Year: 2014).*

(Continued)

*Primary Examiner* — Daniel T Pellett
(74) *Attorney, Agent, or Firm* — Gennadiy Vinokur; Hironori Tsukamoto (57) ABSTRACT

A method for performing multi-label classification includes extracting a feature vector from an input vector including input data by a feature extractor, determining, by a label predictor, a relevant vector including relevant labels having relevant scores based on the feature vector, updating a binary masking vector by masking pre-selected labels having been selected in previous label selections, applying the updated binary masking vector to the relevant vector such that the relevant label vector is updated to exclude the pre-selected labels from the relevant labels, and selecting a relevant label from the updated relevant label vector based on the relevant scores of the updated relevant label vector.

20 Claims, 6 Drawing Sheets

(56) References Cited

OTHER PUBLICATIONS

Dekel et al. "Multiclass-Multilabel Classification with More Classes than Examples". Proceedings of the 13th International Conference on Artificial Intelligence and Statistics (AISTATS) 2010, Chia Laguna Resort, Sardinia, Italy. vol. 9 of JMLR:W&CP 9. (Year: 2010).*
Yu, Hsiang-Fu, et al. "Large-scale multi-label learning with missing labels." International conference on machine learning. 2014. (Year: 2014).*
Dai, Jifeng, Kaiming He, and Jian Sun. "Convolutional feature masking for joint object and stuff segmentation." Proceedings of the IEEE conference on computer vision and pattern recognition. 2015. (Year: 2015).*
Read et al. "Classifier chains for multi-label classification," Mach Learn (2011) 85:333-359 DOI 10.1007/s10994-011-5256-5. Jun. 30, 2011.
Read et al. "Multi-Label Classification using ensembles of pruned sets," Proceedings of the 8th IEEE International Conference on Data Mining. Dec. 15, 2008 pp. 995-1000.
Charte et al. "Li MLC a label inference methodology for addressing high dimensionality in the label space for multilabel classification." IEEE Transactions on Neural Networks and Learning Systems, vol. 25, No. 10, Jan. 9, 2014. pp. 1842-1854.
Gibaja et al. "A Tutorial on Multilabel Learning," ACM Computing Surveys, vol. 47, No. 3, 52, Apr. 2015.

* cited by examiner

|  | Binary Relevance | Classifier Chain | This invention |
|---|---|---|---|
| F-score | 0.155 | 0.342 | 0.367 |
| Inferrence time [sec] per sub-dialog | 0.713 | 14.729 | 1.324 |

FIG. 6

METHOD AND SYSTEM FOR MULTI-LABEL CLASSIFICATION

FIELD OF THE INVENTION

This invention generally relates to a method and system for label classification, and more specifically to a method and system for multi-label classification.

BACKGROUND OF THE INVENTION

Recently, various types of data can be generated easily by humans using electric devices such as digital cameras, personal computers and smart phones. The data are, for example, images, audio signals, videos, text documents, etc., and they are written into a storage medium with some filenames. However, it is not easy to classify such data files according to some topic of interest, because the content of each data file needs to be checked by ears and eyes. This is time consuming and hard work for a large amount of data.

Methods for automatically annotating data is useful to solve this kind of problems. One traditional approach is to assign one label to each data instance. For example, a text document that explains a presidential election can be annotated with label "politics." Another document that reports a basketball game can be annotated with label "sports." This is a single label classification approach, which goal is to infer the most relevant label to the data instance from a predefined label set. To perform this procedure in an automatic way, a classifier trained with a set of pairs of human annotated label and data instance is used to predict an appropriate label for each new data instance.

However, this approach is not enough to annotate real-world data with meaningful labels, because many of data often relates to multiple topics or categories.

For example, a news article on health care systems may relate to two topics, "medical issue" and "politics." Furthermore, it is also possible to assign multiple labels with different granularities to one instance, e.g. an article on a basketball game of Boston Celtics and Chicago Bulls can be annotated with multiple labels, "sports," "basketball," "NBA," and "Boston Celtics," Thus, annotations with multiple labels are more informative than those with single labels.

Assigning multiple labels to each data instance is considered a multi-label classification problem, which is more complicated than the single-label classification problem since it is necessary to select multiple labels for each instance but it is unknown how many labels should to be selected.

The basic approach to multi-label classification is the binary relevance (BR) method. Given a set of M pre-defined labels to be assigned, the problem is transformed into a set of M independent binary classification problems, where one classifier for each label is trained and used to predict whether or not the corresponding label is relevant to a data instance. By applying such multiple binary classifiers to a data instance, it is possible to obtain a set of labels for which the corresponding classifiers have predicted to be relevant. However, these binary classifiers are basically trained and applied independently. Hence, label inter-dependency is ignored even though they correlate with each other. For example, "sports" and "baseball" are closely correlated but "sports" and "presidential election" are not. This kind of knowledge usually helps to improve the accuracy of multi-label classification.

Several methods have been proposed to consider the label inter-dependency in the classifier design or the objective function used for training.

Figure 1:
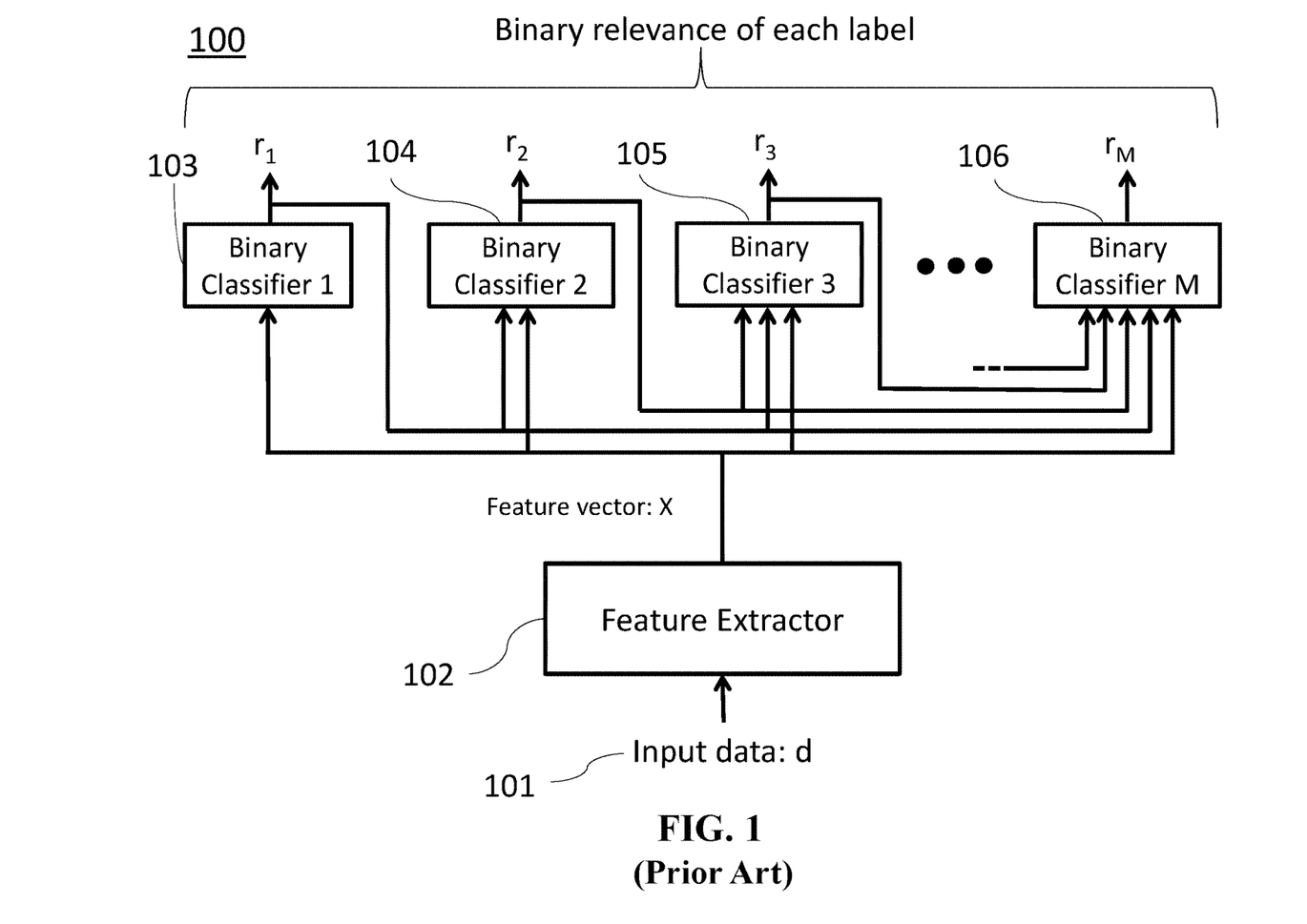
FIG. 1 is a block diagram of a classifier chain (CC) method of a related art for multi-label classification.

FIG. 1 shows a Classifier Chain (CC) method 100 of a related art, in which a set of M binary classifiers is designed as a chain.

The CC method 100 employs an input data 101, a feature extractor 102, a plurality of binary classifiers indicated as classifiers 103-106 as indicated in the figure.

Given the input data instance 101, a feature vector X is extracted by the feature extractor 102 and the feature vector X is fed to the first binary classifier 103. The binary relevance to the first label, $r_1$, is inferred by the first binary classifier 103 and it is fed to the second binary classifier 104 together with X. The binary relevance to the second label, $r_2$, is inferred by the second binary classifier 104 and it is fed to the third binary classifier 105 together with X. The binary relevance to the third label, r3, is inferred by the third binary classifier 105.

In this way, the binary classification process is repeated to the final M-th classifier 106. This method also considers inter-label dependency, which is given by the previous classifiers in the chain, but this approach does not needs two-stage training process, in which the grandtruth binary relevance can be used to train the succeeding classifiers. The CC method outperforms the simple BR method and the stacked BR method in most metrics used for evaluation of multi-label classification methods.

However, the CC method requires a number of M-step binary classifications in the inference phrase, where the binary classification results given by the preceding classifiers need to be fed to the succeeding classifiers. These steps cannot be parallelized because the input vector for each classifier is dependent on the outputs of the preceding classifiers in the chain. If the number of M is large, the computation time for multi-label classification becomes expensive.

The CC method seems to be effective since label inter-dependency is directly handled. However, it requires a lot of iterative steps in the inference phase if the number of predefined labels is large. This is a big limitation in order to annotate each data with various labels in a large set of pre-defined labels for multi-label classification.

Accordingly, there is a need to perform multi-label classification with less iterative steps in the interference phase and less expensive cost.

SUMMARY OF THE INVENTION

This invention relates generally to annotating raw data such as images, audio signals, and text documents with a set of labels relevant to the content of the data.

Some embodiments of the invention are based on a recognition that target data of interest can be found quickly from a large data set, a lot of raw data can be stored automatically into a structured data format, and intelligent systems can be built, which provides services to users according to given image, audio, and/or document data, by a method for generating multi-relevant labels includes steps of extracting a feature vector from an input vector including input data by a feature extractor; determining, by a label predictor, a relevant vector including relevant labels having relevant scores based on the feature vector; updating a binary masking vector by masking pre-selected labels having been selected in previous label selections; applying the updated binary masking vector to the relevant vector such that the relevant label vector is updated to exclude the pre-selected labels from the relevant labels; and selecting a relevant label from the updated relevant label vector based on the relevant scores of the updated relevant label vector.

Accordingly, in some embodiments according to the invention, the use of a method and system for multi-label classification can reduce central processing unit (CPU) usage, power consumption and/or network bandwide width usage.

The embodiments of the invention provide a method and system for multi-label classification, which achieves high prediction accuracy with small computation time even when using a large set of pre-defined labels.

Further, another embodiment of the invention discloses a system for generating multi-relevant labels including an input interface for receiving input data from an input device; a processor in connection with the input interface and a memory storing codes of algorithm modules, wherein the processor performs, in response to the input data, steps according to instructions of the algorithm modules, wherein the steps comprises: extracting a feature vector from an input vector including input data by a feature extractor; determining, by a label predictor, a relevant vector including relevant labels having relevant scores based on the feature vector; updating a binary masking vector by masking pre-selected labels having been selected in previous label selections; applying the updated binary masking vector to the relevant vector such that the relevant label vector is updated to exclude the pre-selected labels from the relevant labels; and selecting a relevant label from the updated relevant label vector based on the relevant scores of the updated relevant label vector.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Some embodiments of the invention are based on recognitions that it is possible to suppress that the same label is generated again for the same data instance by masking the relevance scores for already generated labels.

The label inter-dependency is considered directly as in the CC method, but it does not require iterations over all the pre-defined labels since the classifier predicts one relevant label but not a binary relevance of each label. Accordingly, the number of iterations is only the number of labels assigned to the data instance.

The multi-label classification system receives input data from an input device such as a camera, an image scanner, a microphone, a hard disk drive and a computer network. The system performs the multi-label classification method using a feature extraction model and a label generation model for the input data, and outputs the generated labels to an output device such as a hard disk drive, display monitor, and computer network.

Some embodiments of the invention provide a method and system for the multi-label classification.

Figure 2:
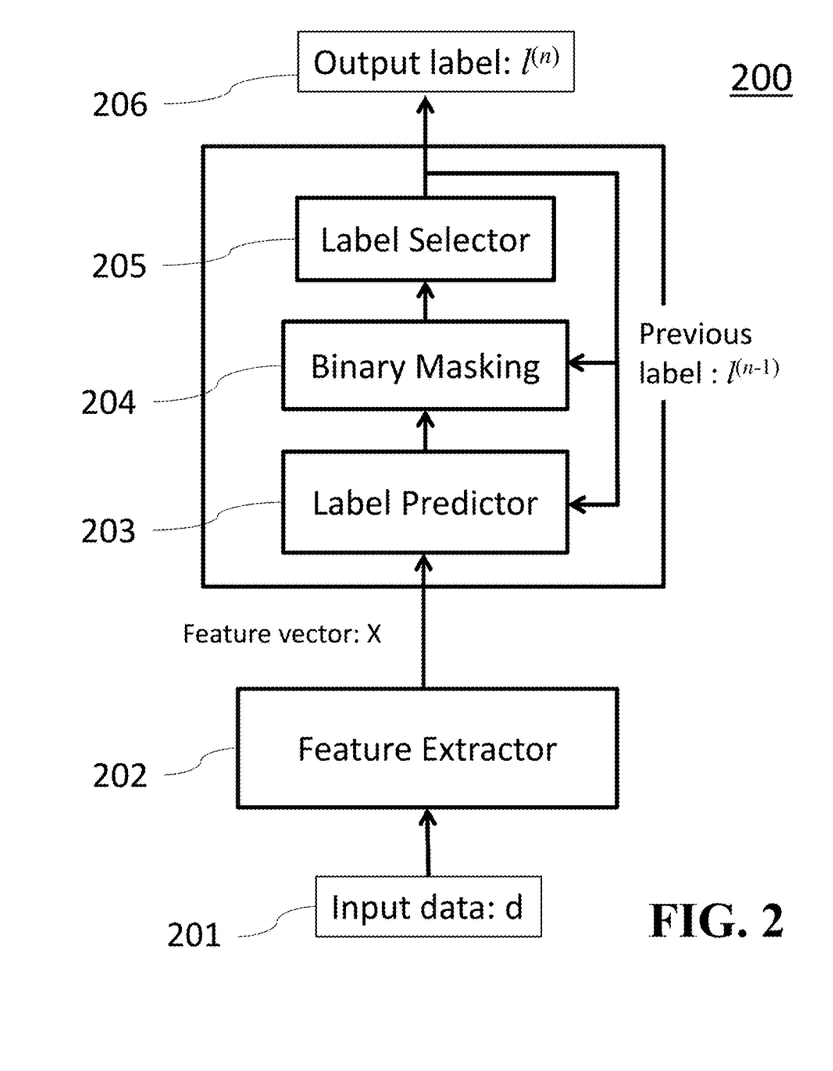
FIG. 2 is a block diagram of a method for multi-label classification according to embodiments of the invention.

FIG. 2 shows a block diagram of a multi-label classification method 200 for multi-label classification according to some embodiments of the invention.

In some embodiments of the invention, the multi-label classification method 200 employs an input data 201, a feature extractor 202, a label predictor 203, a binary masking 204 and a label selector 205 for providing an output label 206.

The multi-label classification method 200 may be performed using algorithm modules including the feature extractor 202, the label predictor 203, the binary masking 204 and the label selector 205. The algorithm modules 202-205 may be stored into a memory or a storage as program codes, and be referred to as a multi-label classification algorithm module 250 (indicated in FIG. 5). When the method 200 is performed with a processor in connection with the memory and the storage, the algorithm modules cause the processor to perform the method 200 according to the instructions of the algorithm modules. The method 200 performs steps of extracting a feature vector from an input vector including input data by a feature extractor, determining, by a label predictor, a relevant vector including relevant labels having relevant scores based on the feature vector, updating a binary masking vector by masking pre-selected labels having been selected in previous label selections, applying the updated binary masking vector to the relevant vector such that the relevant label vector is updated to exclude the pre-selected labels from the relevant labels, and selecting a relevant label from the updated relevant label vector based on the relevant scores of the updated relevant label vector.

In some embodiments of the invention the method 200 performs multi-label classification by iteratively generating labels. The method 200 may include steps of (i) extracting a feature vector from an input vector including input data, (ii) computing a relevance score or probability of each label in a pre-defined label set to the feature vector and the previously generated label, (iii) masking the relevance scores or probabilities of labels generated in the prior iterations, wherein the scores or probabilities may be set to a small constant, e.g. zero, (iv) selecting a label with the highest score or probability, (v) adding the selected label to the set of generated labels, (vi) going back to step (ii) until a special label indicating "no more labels to be generated" is selected in step (iv).

Figure 5:
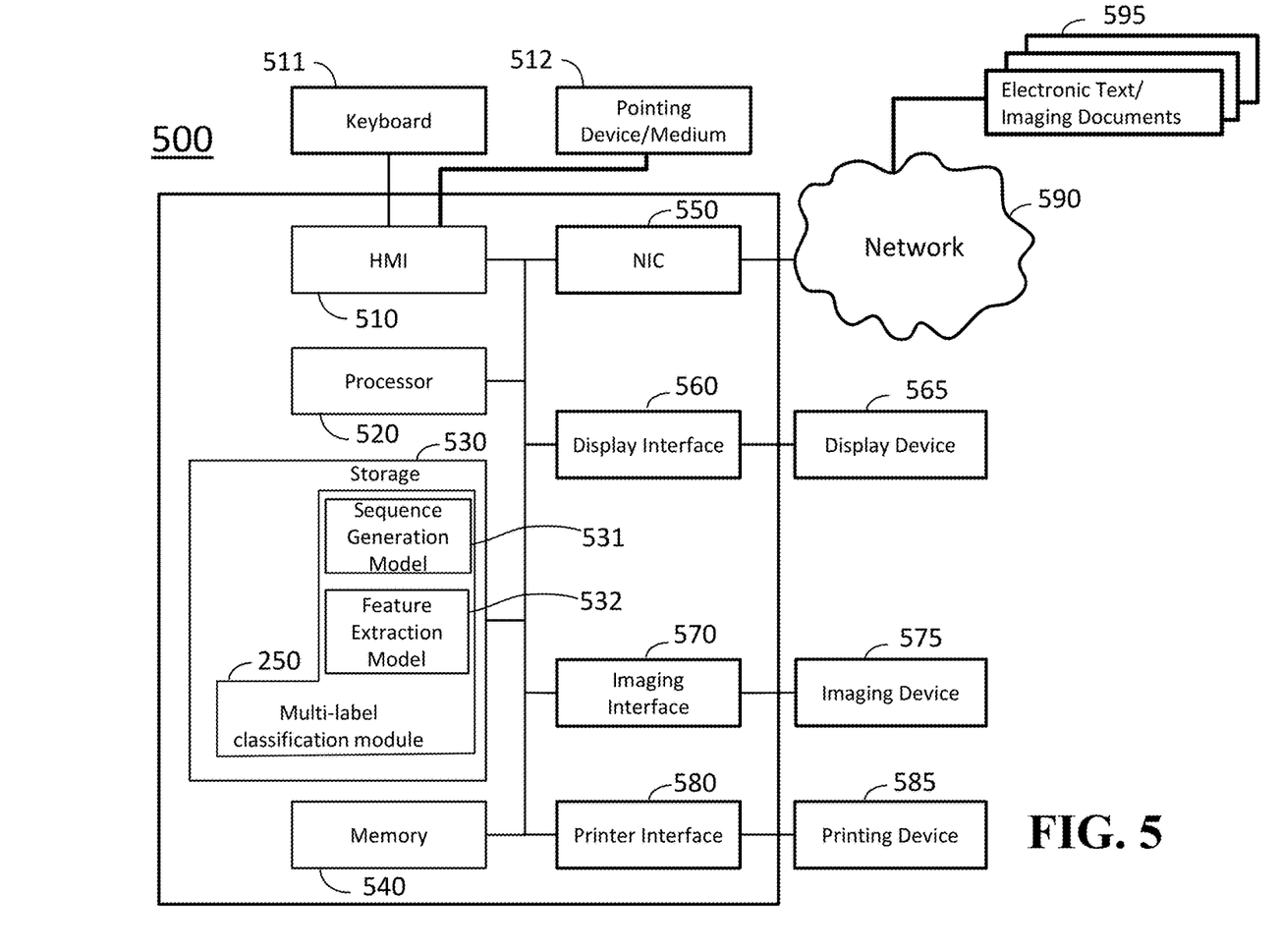
FIG. 5 is a block diagram of a multi-label classification system according to some embodiments of the invention.

In some embodiments according to the invention, a multi-label classification system 500 can receive input data from an input device, perform the multi-label classification method using a feature extraction model and a label generation model for the input data, and output the generated labels to an output device.

The method 200 and system 500 can achieve both a higher labeling accuracy by considering label inter-dependency and a fast inference process with a smaller number of iterations compared to state-of-the-art methods.

Further, a multi-label classifier apparatus according to some embodiments of the invention can be designed as a recurrent neural network. In this case, the multi-label classifier apparatus predicts the most relevant label for both the input features and the previously generated labels in each iterative step.

The multi-label classification method 200 is described in detail below. Suppose we have a pre-defined label set L={$l_m$|m=1, . . . , M} for multi-label classification, where M denotes the number of labels in L.

The input data instance 201 is given to the feature extractor 202, wherein the data instance is converted to a D-dimensional feature vector x∈$\mathbb{R}^D$, that contains salient features of the data instance. The feature vector x is then given to the label predictor 203, and the label predictor 203 computes a relevance probability (relevant score) of each label using the feature vector and the previously generated label. Then, the label predictor outputs an M-dimensional vector of relevance probabilities. In some embodiments of the invention, the label predictor 203 may compute relevant scores using a recurrent neural network.

The binary masking module 204 masks the relevance probability vector, where the vector elements corresponding to the previously generated labels are set to zero. The label selector 205 selects one label whose probability is the highest in the masked relevance probability vector. The selected label is generated and sent to the label predictor 203 and the binary masking module 204 to generate the next label. The process from the label prediction 203 to the label selection 205 is repeated until a special label indicating "no more labels to be generated" is selected. After N iterations, a set of relevant labels, R={$l^{(n)}$∈L|n=1, . . . , N}, is obtained for the given data instance. Detailed description of each processing module is presented in the following sections.

According to some embodiments of the invention, selecting relevant labels can be performed based on relevant scores computed by the recurrent neural network.

Feature Extraction

The feature extractor 202 converts an input data instance to a feature vector, which contains salient features useful for classification of the data. If the data is a text document of word sequence of length T, the sequence is first converted to a sequence of word Id numbers, W=$w_1, w_2, \ldots, w_t, \ldots, w_T$, where $w_t$ for any t=1, . . . , T is a positive integer such that 1≤$w_t$≤|V|. V is a set of pre-defined words, called vocabulary, in which each word has a unique Id number, and |V| represents the vocabulary size.

In accordance with some embodiments of the invention, feature extractions from text documents can be performed by some methods. For instance, the "bag-of-words" can be used, by which the word Id sequence is converted to a |V|-dimensional binary feature vector $x^{BOW}$∈{0, 1}$^{|V|}$, in which i-th element $x^{BOW}[i]$ is obtained as:

$$x^{BOW}[i] = \begin{cases} 1 & \text{if } i \in W \\ 0 & \text{if } i \notin W \end{cases}, \quad \forall i \in \{i | 1 \leq i \leq |V|, i \in \mathbb{N}\}.$$

This vector represents what words are included in the document.

Further, it is possible to use a feature extraction model for feature extraction. A neural network is recently used as a feature extraction model.

If the input data is a text document, each word identification (Id) number $w_t$∈W is first converted to a one-hot vector $\bar{w}_t$∈{0, 1}$^{|V|}$ where its i-th element $\bar{w}_t[i]$ can be obtained as:

$$\bar{w}_t[i] = \begin{cases} 1 & \text{if } i = w_t \\ 0 & \text{if } i \neq w_t \end{cases}, \quad \forall i \in \{i | 1 \leq i \leq |V|, i \in \mathbb{N}\}.$$

Then, the sequence of one-hot vectors, $\bar{W}=\bar{w}_1, \bar{w}_2, \ldots, \bar{w}_t, \ldots, \bar{w}_T$, is given to a recurrent neural network (RNN), and a sequence of feature vectors can be obtained as a sequence of activation vectors of the RNN. For instance, a bidirectional long short-term memory (BLSTM) RNN can be used.

Figure 3:
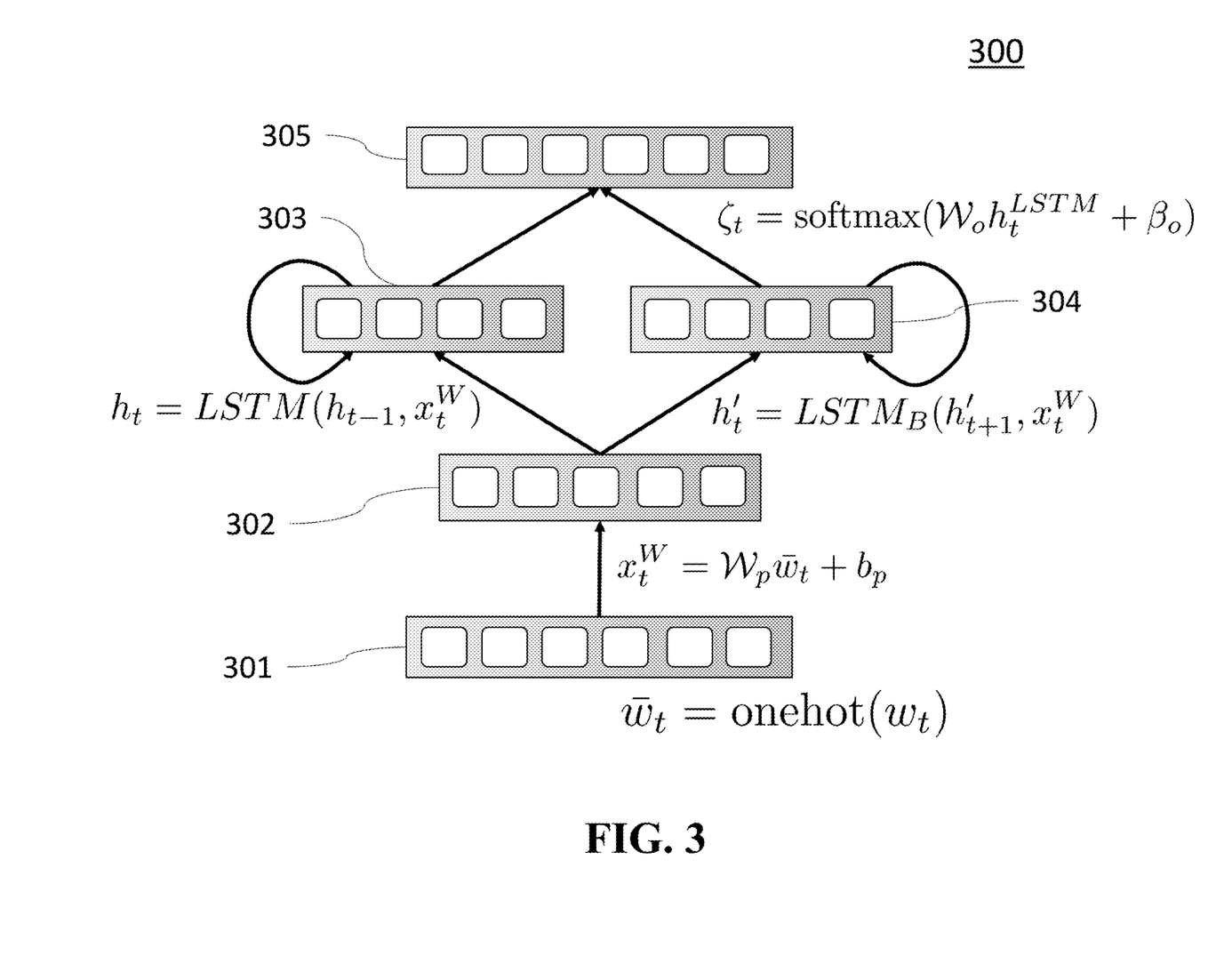
FIG. 3 is a block diagram of a system for multi-label classification according to embodiments of the invention.

FIG. 3 shows a structure of a bidirectional long short-term memory recurrent (BLSTM) neural network (RNN) 300. The BLSTM RNN 300 may be referred to as a BLSTM network 300 or a network 300.

The BLSTM network 300 includes an input layer 301, a projection layer 302, a forward LSTM layer 305, a backward LSTM layer 304 and an output layer 305.

In the input layer 301 of the BLSTM network 300, one-hot vector $\bar{w}w_t$ is obtained to feed the input data to the BLSTM network 300. In the projection layer 302, then P-dimensional vector $x_t^W$ is computed using an affine transformation with P×|V| matrix $\mathcal{W}_p$∈$\mathbb{R}^{P \times |V|}$ and P-dimensional bias vector $b_p$∈$\mathbb{R}^P$, i.e.

$$x_t^W = \mathcal{W}_p \bar{w}_t + b_p.$$

This transformation is used for dimensionality reduction from |V| to P, where |V| is usually greater than 5000, while P is selected as a smaller number around 100~300.

In the forward LSTM layer 303, an H-dimensional activation vector $h_t$∈$\mathbb{R}^H$ is computed using a LSTM function, $$h_t = \text{LSTM}(h_{t-1}, x_t^W),$$

which is computed as:

$$h_t = o_t \odot \tan h(c_t)$$

$$o_t = \sigma(\mathcal{W}_{xo} x_t + \mathcal{W}_{ho} h_{t-1} + b_o)$$

$$c_t = f_t \odot c_{t-1} + i_t \odot \tan h(\mathcal{W}_{xc} x_t + \mathcal{W}_{hc} h_{t-1} + b_c)$$

$$f_t = \sigma(\mathcal{W}_{xf} x_t + \mathcal{W}_{hf} h_{t-1} + b_f)$$

$$i_t = \sigma(\mathcal{W}_{xi} x_t + \mathcal{W}_{hi} h_{t-1} + b_i),$$

where we assume $x_t = x_t^W$, σ(·) is the element-wise sigmoid function, tan h(·) is the hyperbolic tangent function, and $i_t$, $f_t$, $o_t$ and $c_t$ are the input gate, forget gate, output gate, and cell activation vectors for $x_t$, respectively, and $i_t$, $f_t$, $o_t$, $c_t$∈$\mathbb{R}^H$. ⊙ denotes the element-wise multiplication between vectors. The weight matrices $\mathcal{W}_{zz}$ and the bias vector $b_z$ are the parameters of the LSTM function, which are identified by the subscript z∈{x, h, i, f, o, c}. For example, $\mathcal{W}_{hi}$ is the hidden-to-input gate matrix and $\mathcal{W}_{xo}$ is the input-to-output gate matrix. The activation vector $h_t$ is obtained recursively from the input vector $x_t$ and the previous activation vector $h_{t-1}$, where $h_0$ is assumed to be a zero vector of H dimensions.

On the other hand, in the backward LSTM layer 304, an activation vector $h'_t$ is also obtained in reverse order from t=T to 1, where the backward LSTM function is applied as:

$$h'_t = \text{LSTM}_B(h'_{t+1}, x_t^W),$$

where $\text{LSTM}_B(\cdot)$ is computed as:

$$h'_t = o'_t \odot \tan h(c'_t)$$

$$o'_t = \sigma(W'_{xo}x_t + W'_{ho}h'_{t+1} + b'_o)$$

$$c'_t = f'_t \odot c'_{t+1} + i'_t \odot \tan h(W'_{xc}x_t + W'_{hc}h'_{t+1} + b'_c)$$

$$f'_t = \sigma(W'_{xf}x_t + W'_{hf}h'_{t+1} + b'_f)$$

$$i'_t = \sigma(W'_{xi}x_t + W'_{hi}h'_{t+1} + b'_i),$$

in the same manner as the forward LSTM layer 303, and $h'_{T+1}$ is assumed to be a zero vector of H dimensions.

Finally, the concatenated vector of the forward and backward activation vectors $$x_t^{LSTM} = \begin{bmatrix} h_t \\ h'_t \end{bmatrix}$$

is made for t=1, . . . , T, and the feature vector sequence is obtained.

As in FIG. 3, the output layer 305 is included in the network 300. In some embodiments of the invention, this layer 305 may be ignored when the network is used for feature extraction. The output layer 305 may be used in the training phase of the network.

For image data, Scale-Invariant Feature Transform (SIFT) and Histograms of Oriented Gradients (HOG) are available. For audio data, Mel-Frequency Cepstral Coefficients (MFCCs) are widely used.

Furthermore, it is possible to combine these basic features with neural networks, in which the basic features are first extracted and then fed to a neural network, and the output vector of the neural network is obtained as a feature vector. It is also possible to feed raw data to a neural network directly for feature extraction.

An advantage of using a neural network for feature extraction is that the feature extractor, i.e. the neural network, can be trained jointly with the classifier that uses the extracted feature vectors if the classifier is also a neural network. Consequently, the feature extractor can output better feature vectors for the classifier, which improve the classification accuracy.

Sequence Generator for Multi-Label Classification

The sequence generator according to the embodiments of the invention is shown in FIG. 2. A feature vector or a sequence of feature vectors made by the feature extractor 202 is fed to the label predictor 203, which infers relevance probabilities of labels for the input vector(s). Here, we show an example of using an attention-based recurrent sequence generator (ARSG) as the label predictor.

Given a sequence of feature vectors $X = x_1, \ldots, x_t, \ldots, x_T$ such that $x_t \in \mathbb{R}^Z$, the ARSG infers relevance probabilities of labels iteratively.

The ARSG is a recurrent neural network with an attention mechanism. The attention mechanism is used to aggregate multiple feature vectors, e.g. a sequence of vectors, into one vector as a weighted average of those vectors, i.e.

$$g_n = \sum_{t=1}^{T} \alpha_{n,t} x_t$$

where $g_n$ is the aggregated vector at the n-th iteration, $\alpha_{n,t}$ is the attention weight for the t-th vector at the n-th iteration, where $\Sigma_{t=1}^{T} \alpha_{n,t} = 1$ and $\alpha_{n,t} \geq 0$.

Since feature vectors with high attention weights are dominant in $g_n$, some specific feature vectors can be emphasized for better classification by estimating the attention weights appropriately. For example, if the input data is a text document including feature vectors corresponding to a specific phrase, the feature vectors can be emphasized to predict a label, which is closely related to the phrase.

ARSG is a recurrent neural network with attention mechanism. The hidden activation vector of ARSG can be obtained using a LSTM function as:

$$s_n = LSTM\left(s_{n-1}, \begin{bmatrix} y_n \\ g_n \end{bmatrix}\right)$$

where $s_n \in \mathbb{R}^K$ is a K-dimensional activation vector of the ARSG. $y_n$ is a J-dimensional vector corresponding to the generated label at n-th iteration, which is obtained by projecting the generated label to a J-dimensional vector after converting the label to an M-dimensional one-hot vector as:

$$y_n = W_y \text{onehot}(l^{(n)}) + b_y$$

where the function onehot( ) converts a label to a one-hot vector that has 1 for the element corresponding to the label Id number and 0 for others. $W_y \in \mathbb{R}^{J \times M}$ and $b_y \in \mathbb{R}^J$ are the projection matrix and the bias vector for labels, respectively.

Since $s_n$ is updated with the previous activation vector $s_{n-1}$, the generated label $l^{(n)}$, and the aggregated feature vector $g_n$, it holds the contextual information of the generated labels and the attended feature vectors until n-th iteration.

The M-dimensional relevance probability vector at n-th iteration, $\gamma_n$, is obtained using the contextual information $s_{n-1}$ and current aggregated feature vector $g_n$ as:

$$\gamma_n = \text{softmax}(W_{SO}s_{n-1} + W_{GO}g_n + b_{SO})$$

where $W_{SO} \in \mathbb{R}^{M \times K}$ and $W_{GO} \in \mathbb{R}^{M \times Z}$ are transformation matrices, and $b_{SO} \in \mathbb{R}^M$ is a bias vector. The softmax( ) function is computed as:

$$\text{softmax}(x) = \left. \frac{\exp(x[i])}{\sum_{j=1}^{D} \exp(x[j])} \right|_{i=1,\ldots,D}$$

for a D-dimensional vector x.

The attention weights are computed in the same manner as follows:

$$\alpha_{n,t} = \frac{\exp(e_{n,t})}{\sum_{\tau=1}^{T} \exp(e_{n,\tau})}$$

and $$e_{n,t} = \omega_A^T \tan h(W_{AS}s_{n-1} + W_{AX}x_t + b_A),$$

where $W_{AS} \in \mathbb{R}^{Q \times K}$ and $W_{AX} \in \mathbb{R}^{Q \times Z}$ are transformation matrices, and $b_A \in \mathbb{R}^Q$ is a bias vector, and $\omega_A \in \mathbb{R}^Q$ is a vector. $e_{n,t}$ represents the importance of input feature $x_t$ in given context $s_{n-1}$. Then, $e_{n,t}$ is converted to attention weight $\alpha_{n,t}$ such that $\Sigma_{t=1}^T \alpha_{n,t} = 1$ and $\alpha_{n,t} \geq 0$.

In the binary masking module 204, the relevance probability vector $\gamma_n$ is masked so that an already-generated label is not selected again in the label selector 205. This mechanism is not included in the original ARSG since the ARSG is not made for multi-label classification. By this binary masking, we can avoid generating the same label again and performing unnecessary iterations.

In the binary masking module 204, the relevance probability vector $\gamma_n$ is masked using a binary vector B, which elements are given as $$B[l] = \begin{cases} 1 & \text{if } l \notin S_{n-1} \\ 0 & \text{if } l \in S_{n-1} \end{cases}$$

where l indicates a label Id number, and $S_{n-1}$ is a set of labels generated until the (n−1)-th iterations. With the element-wise multiplication of B and $\gamma_n$, the masked relevance probability vector $\gamma_n'$ is obtained as $$\gamma_n' = B \odot \gamma_n.$$

In the label selector 205, the n-th label is selected as $$l^{(n)} = \underset{l: 1 \leq l \leq M}{\arg\max}\, \gamma_n'[l]$$

based on the masked relevance probability vector $\gamma_n'$, where we assume each label is represented as a label Id number.

By repeating the above label generation process from n=1 until a special label indicating "no more labels to be generated", e.g. <nol>, is selected, a set of relevant labels, $R = \{l^{(n)} \in L | n=1, \ldots, N\}$, is finally obtained for the given input feature vectors, where N is the number of iterations actually performed.

The binary vector can be updated after selecting the n-th label by $$B[l^{(n)}] = 0$$

for the next iteration, where all B's elements have initially been set to one before starting the label generation.

The procedure of the sequence generator is summarized in Algorithm 1. Lines 1-4 correspond to the initialization steps. At line 1, initial label $l^{(0)}$ is set to a special label "<start>" that represents the beginning of the label sequence, where Id( ) is a function that returns the Id number of the given label. At line 2, $l^{(0)}$ is converted to $y_0$. Line 3 obtains the initial activation vector $s_0$ from $y_0$, where $0^K$ is a K-dimensional zero vector, and $0^Z$ is a Z-dimensional zero vector. Line 4 prepares an initial binary masking vector such that all the elements are one.

In lines from 5 to 17, label generation steps are iterated until $n = N_{max}$, but if a special label "<nol>" is selected at line 11, the algorithm exits from the iteration loop at line 13. $N_{max}$ can be set to any natural number, but it should not be greater than M because the algorithm never generates labels more than M labels. Although the algorithm potentially iterates $N_{max}$ times in worst case, it usually finishes with much less iterations by selecting the special label.

---

Algorithm 1:

Input: $X = x_1, \ldots, x_T$
Output: $R = \{l^{(1)}, l^{(2)}, \ldots\}$

1.  $l^{(0)} = \text{Id}(\text{"<start>"})$
2.  $y_0 = W_y \text{onehot}(l^{(0)}) + b_y$
3.  $s_0 = \text{LSTM}\left(0^K, \begin{bmatrix} y_0 \\ 0^Z \end{bmatrix}\right)$
4.  $B[l] = 1$ for $l = 1$ to M
5.  for n=1 to $N_{max}$ do:
6.  $e_{n,t} = \omega_A \tanh(W_{AS} s_{n-1} + W_{AX} x_t + b_A)$ for $t = 1$ to T
7.  $\alpha_{n,t} = \dfrac{\exp(e_{n,t})}{\sum_{\tau=1}^T \exp(e_{n,\tau})}$ for $t = 1$ to T
8.  $g_n = \Sigma_{t=1}^T \alpha_{n,t} x_t$
9.  $\gamma_n = \text{softmax}(W_{SO} s_{n-1} + W_{GO} g_n + b_{SO})$
10. $\gamma_n' = B \odot \gamma_n$
11. $l^{(n)} = \underset{l: 1 \leq l \leq M}{\arg\max}\, \gamma_n'[l]$
12. if $l^{(n)} = \text{Id}(\text{"<nol>"})$ then
13.     exit for loop
14. $B[l^{(n)}] = 0$
15. $y_n = W_y \text{onehoot}(l^{(n)}) + b_y$
16. $s_n = \text{LSTM}\left(s_{n-1}, \begin{bmatrix} y_n \\ g_n \end{bmatrix}\right)$
17. end for

---

Multi-Label Classification System

Figure 4:
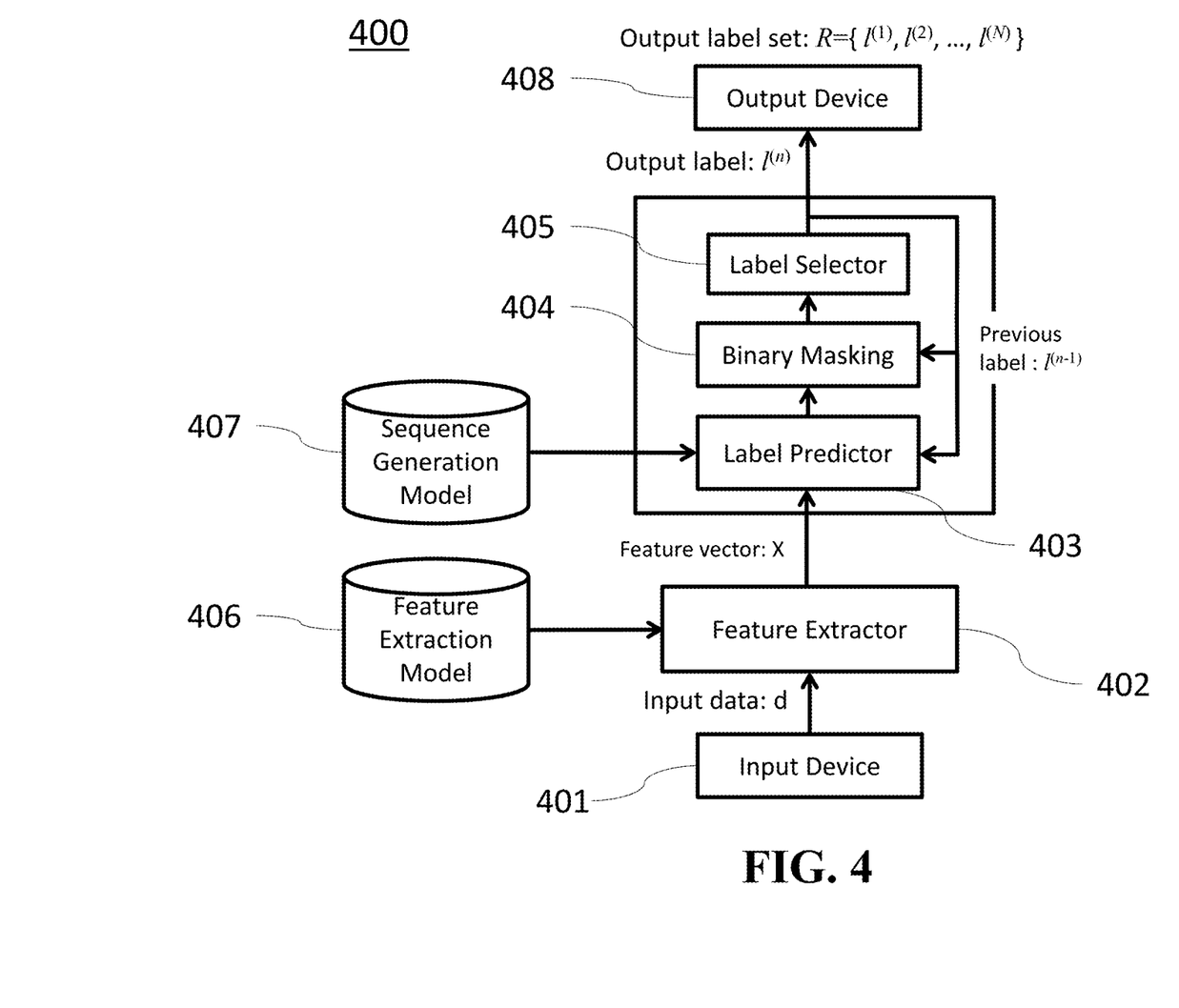
FIG. 4 is a schematic diagram of a bidirectional long short-term memory (BLSTM) recurrent neural network used by embodiments of the invention.

FIG. 4 shows a block diagram of an apparatus for multi-label classification according to embodiments of the invention.

A multi-label classification apparatus 400 includes an input device 401, a feature extractor 402, a label predictor 403, a binary masking 404, a label selector 405, a feature extraction model 406, a sequence generation model 407 and an output device 308, in which the feature extraction model and the sequence generation model are stored in storages 406 and 407 connected to a processor. The sequence generation model and the feature extraction model may be formed by neural networks.

The multi-label classification apparatus 400 reads a feature extraction model such as a BLSTM RNN from the storage 406 and gives to the feature extractor 402. The system also reads a sequence generation model such as an ARSG from storage 407 and gives to the label predictor 403.

The multi-label classification apparatus 400 receives an input data instance from the input device 401. The input device 401 can be a camera, an image scanner, a microphone, a hard disk drive or a computer network.

The processor of the multi-label classification apparatus 400 executes a computer program that implements the multi-label classification method, in which it performs feature extraction and label sequence generation using the feature extraction model and the sequence generation model. For generating labels, the label predictor 403, the binary masking 404, and the label selector 405 are executed repeatedly until an end label is selected. In some embodiments, the label predictor 403 may predict labels using a recurrent neural network.

The multi-label classification apparatus 400 outputs the generated labels to the output device 408. In this case, the output device 408 can be a display, a hard disk drive, or a computer network. Further, in some embodiments of the invention, the output device 408 can be included in the multi-label classification apparatus 400 or a multi-label classification system.

FIG. 5 shows a block diagram of a multi-label classification system 500 according to some embodiments of the invention. The multi-label classification system 500 includes a human machine interface (HMI) 510 connectable with a keyboard 511 and a pointing device/medium 512, a processor 520, a storage device 530, a memory 540, a network interface controller 550 (NIC) connectable with a network 590 including local area networks and internet network, a display interface 560, an imaging interface 570 connectable with an imaging device 575, a printer interface 580 connectable with a printing device 585. The multi-label classification system 500 can receive electric text/imaging documents 595 via the network 590 connected to the NIC 550. The storage device 530 includes a multi-label classification module 250, a sequence generation model 531, and a feature extraction model 532. The pointing device/medium 512 may include modules that read programs stored on a computer readable recording medium. The multi-label classification module 250, the sequence generation model 531 and the feature extraction model 532 may be formed by neural networks.

For performing multi-label classification, instructions may be transmitted to the multi-label classification system 500 using the keyboard 511, the pointing device/medium 512 or via the network 590 connected to other computers (not shown in the figure). The system 500 receives instructions via the HMI 510 and executes the instructions for performing multi-label classifications using the processor 520 in connection with the memory 540 by loading the multi-label classification module 250, the sequence generation model 531 and the feature extraction module 532 stored in the storage device 530.

Training of Sequence Generator for Multi-Label Classification

The sequence generator needs to be trained with training data before using it for multi-label classification.

Given a training data set consisting of U samples, $$\mathcal{D} = \{(X_1, R_1), (X_2, R_2), \ldots, (X_u, R_u), \ldots, (X_U, R_U)\},$$

where $X_u$ is a feature vector or a sequence of feature vectors, which is extracted from u-th data instance. $R_u$ is a set of ground truth labels $\{l_u^{(1)}, l_u^{(2)}, \ldots, l_u^{(N_u)}\}$ for $X_u$, which is prepared manually.

The objective function is computed based on the cross-entropy:

$$\mathcal{L}(\Lambda, \mathcal{D}) = -\sum_{u=1}^{U} \log P(R_u \mid X_u, \Lambda)$$

where $\Lambda$ is the set of parameters of the sequence generator. In the case of ARSG, the parameter set consists of $$\Lambda = \{W_{xo}, W_{ho}, b_o, W_{xc}, W_{hc}, b_c, W_{xf}, W_{hf}, b_f,$$
$$W_{xi}, W_{hi}, b_i, W_{y}, b_y, W_{AS}, W_{AX}, b_A, \omega_A,$$
$$W_{SO}, W_{GO}, b_{SO}\}.$$

With the ARSG, $\log P(R_u \mid X_u, \Lambda)$ is computed as:

$$\log P(R_u \mid X_u, \Lambda) = \sum_{n=1}^{N_u} \log P(l_u^{(n)} \mid l_u^{(1)}, \ldots, l_u^{(n-1)}, X_u, \Lambda) \approx \sum_{n=1}^{N_u} \log \gamma'_{un}[l_u^{(n)}]$$

where $\gamma_{un}'$ is the relevance probability vector inferred in the n-th iteration for input feature vector $X_u$ using the parameter set $\Lambda$. However, $\gamma_{un}'$ cannot be assumed a probability distribution because $\Sigma_{l=1}^{M} \gamma_{un}'[l]$ can be less than 1 due to binary masking. In this invention, $\gamma_{un}'$ is re-normalized to be $\Sigma_{l=1}^{M} \gamma_{un}''[l]=1$ as:

$$\gamma_{un}''[l] = \frac{\gamma_{un}'[l]}{\sum_{m=1}^{M} \gamma_{un}'[m]}$$

and $\gamma_{un}''$ is used instead of $\gamma_{un}'$ in the training phase.

For training the ARSG, the back-propagation through time algorithm can be used to update the parameter set $\Lambda$ so that the objective function is minimized.

Evaluation Result with a Dialog State Tracking Task

The multi-label classification method 200 was evaluated with the 5th Dialog State Tracking Challenge (DSTC5) task, which annotates human-to-human conversations with a set of labels representing the speaker's intention. All the conversations are about Singapore tour, in which a tour guide and a tourist are planning a Singapore tour.

In this task, the conversations are already transcribed and segmented into sub-dialogs. The system has to find appropriate labels for the text document of each sub-dialog. Each sub-dialog contains 6.5 utterances in average, and is annotated with 1-5 labels. We used the most common 200 labels in the training data, i.e. M=200. This label set covers 80% of slot-value pairs in the training set and 78% in the test set.

Each label consists of a slot-value pair such as "ACCOMMODATION: Hotel", "INFO: Pricerange", "ATTRACTION: Zoo", and "FROM: Changi Airport".

For feature extraction, we used a common method based on BLSTM as described in this specification. We also used attention mechanism in all the methods, but in the BR and CC methods, a feed forward network is used, which outputs a binary relevance vector. In CC method, each predicted relevance vector is fed to the network repeatedly over M labels. The feature extractor and ARSG of this invention were designed as |V|=5639, P=50, J=100, Z=100, K=50, M=200. In BR and CC methods, the feed-forward network had two hidden layers with 100 units.

Figure 6:
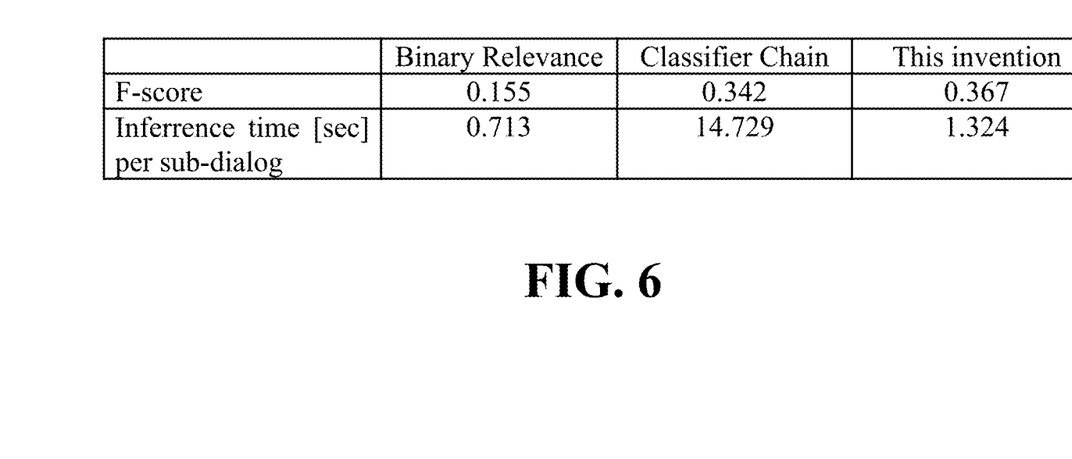
FIG. 6 is an evaluation result obtained by performing a multi-label classification for a predetermined task.

FIG. 6 shows a multi-label classification performance in F-score and computation time in inference phase using a binary relevance (BR) method, a classifier chain (CC), and this invention.

F-score is a harmonic mean of precision and recall rates computed as:

$$\text{Precision} = \frac{TP}{TP + FP}$$

$$\text{Recall} = \frac{TP}{TP + FN}$$

$$\text{F-score} = \frac{2 \times \text{Recall} \times \text{Precision}}{\text{Recall} + \text{Precision}}$$

where TP is the number of true positives, i.e. the number of correctly detected labels, FP is the number of false positives, i.e. the number of incorrectly detected labels, FN is the number of false negatives, i.e. the number of non-detected labels in the ground truth labels. In general, higher a F-score indicates a better system.

FIG. 6 is an example of evaluation results on DSTC5. The computation time was measured on a computer with an Intel® Xeon® processor E52690 v3, 12Core, 2.6 GHz and a single GPU (NVidia Titan X). In the experiments, the program was executed as a single process, and most matrix and vector operations are performed on the GPU. Each computation time in FIG. 6 indicates the average processing time per data instance, i.e. sub-dialog.

The method of this invention outperformed BR and CC methods in F-score. Although the BR method is faster than the other methods, the F-score is much worse (i.e. 0.155). The CC and this invention have comparable F-scores 0.342 and 0.367, respectively, but this invention is significantly faster than the CC method, i.e. the inference time of this invention is 1.324, while that of the CC method is 14.729. Thus, the method and system of this invention achieved both a higher labeling accuracy and a faster inference process.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A method for generating multi-relevant labels, the method comprising steps of:
   extracting a feature vector from an input vector including input data by a feature extractor; and
   providing an initial binary masking vector to start iterations with an initial label, wherein the iterations comprise at least:
   determining, by a label predictor, a relevant vector including relevant labels having relevant scores based on the feature vector;
   updating the binary masking vector by masking pre-selected labels having been selected in previous label selections;
   applying the updated binary masking vector to the relevant vector such that the relevant label vector is updated so as to avoid selecting the same pre-selected labels again from the relevant labels; and
   selecting a relevant label from the updated relevant label vector based on the relevant scores of the updated relevant label vector, wherein the iterations end when an end label is selected.

2. The method of claim 1, further comprising:
   accumulating the relevant label to generate a set of multi-relevant labels.

3. The method of claim 2, wherein the accumulating is continued to until an end label is selected.

4. The method of claim 1, wherein the applying the updated binary masking vector sets the relevant scores of the pre-selected labels to zero.

5. The method of claim 1, wherein, in the selecting, the relevant label having a highest score in the relevant labels of the updated relevant label vector is selected.

6. The method of claim 1, wherein the label predictor employs a recurrent neural network in the determining.

7. The method of claim 1, further comprising:
   generating and transmitting cumulative label information in the selecting to the label predictor.

8. The method of claim 1, wherein the pre-selected labels are the relevant labels having been selected in previous label selections.

9. The method of claim 1, wherein the selecting is performed after the masking.

10. The method of claim 1, wherein the relevant scores is computed by using a recurrent neural network.

11. The method of claim 1, wherein, in the selecting, the relevant label has a highest relevant score among unmasked labels in the relevant vector.

12. The method of claim 1, wherein the masking is performed by using the binary masking vector.

13. A system for generating multi-relevant labels comprising:
   an input interface for receiving input data from an input device;
   a processor in connection with the input interface and a memory storing codes of algorithm modules, wherein the processor performs, in response to the input data, steps according to instructions of the algorithm modules, wherein the steps comprises:
   extracting a feature vector from an input vector including input data by a feature extractor; and
   providing an initial binary masking vector to start iterations with an initial label, wherein the iterations comprise at least:
   determining, by a label predictor, a relevant vector including relevant labels having relevant scores based on the feature vector;
   updating the binary masking vector by masking pre-selected labels having been selected in previous label selections;
   applying the updated binary masking vector to the relevant vector such that the relevant label vector is updated so as to avoid selecting the same pre-selected labels again from the relevant labels; and
   selecting a relevant label from the updated relevant label vector based on the relevant scores of the updated relevant label vector, wherein the iterations end when an end label is selected.

14. The system of claim 13, wherein the steps further comprises:
accumulating the relevant label to generate a set of multi-relevant labels.

15. The system of claim 14, wherein the accumulating is continued to until an end label is selected.

16. The system of claim 13, wherein, in the selecting, the relevant label having a highest score in the relevant labels of the updated relevant label vector is selected.

17. The system of claim 13, wherein the steps further comprises:
   generating and transmitting cumulative label information in the selecting to the label predictor.

18. The system of claim 13, wherein the pre-selected labels are the relevant labels having been selected in previous label selections.

19. The system of claim 13, wherein the relevant scores is computed by using a recurrent neural network.

20. The system of claim 13, wherein, in the selecting, the relevant label has a highest relevant score among unmasked labels in the relevant vector.

* * * * *